US006831895B1

United States Patent
Ji et al.

(10) Patent No.: US 6,831,895 B1
(45) Date of Patent: Dec. 14, 2004

(54) METHODS AND DEVICES FOR RELIEVING CONGESTION IN HOP-BY-HOP ROUTED PACKET NETWORKS

(75) Inventors: Hongbin Ji, Robbinsville, NJ (US); Muralidharan Sampath Kodialam, Marlboro, NJ (US); Yung-Terng Wang, Monmouth, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/314,107

(22) Filed: May 19, 1999

(51) Int. Cl.[7] ................................................. H04J 3/00
(52) U.S. Cl. ....................... 370/237; 370/235; 370/229; 709/239; 709/241
(58) Field of Search ............................... 370/216, 217, 370/218, 219, 220, 221, 222, 223, 224, 225, 226, 227, 228, 237, 238, 238.1; 709/235, 239, 241

(56) References Cited

U.S. PATENT DOCUMENTS

| | | | | |
|---|---|---|---|---|
| 5,253,248 A | * | 10/1993 | Dravida et al. | ............... 370/16 |
| 6,130,876 A | * | 10/2000 | Chaudhuri | .................. 370/228 |
| 6,147,966 A | * | 11/2000 | Johnson et al. | ............. 370/221 |
| 6,304,549 B1 | * | 10/2001 | Srinivasan et al. | ......... 370/230 |

* cited by examiner

Primary Examiner—Alpus H. Hsu
Assistant Examiner—Thien Tran

(57) ABSTRACT

Congestion across links in a network, such as the Internet, is reduced by diverting traffic from the congested link to alternative, shortest paths by adjusting splitting factors associated with the congested and alternative links. The alternative shortest paths comprise equal cost paths. Alternatively, adjustments occur after the creation of additional equal cost paths/shortest paths if none are initially available within the network. Unique programs control the adjustment of the splitting factors and the creation of the additional shortest paths. The programs make use of both existing, real networks and constructed, virtual networks in conjunction with novel traffic flow relationships to divert traffic from a congested link without causing further congestion within the network. Another unique program deletes shortest paths once used to accept traffic diverted from a congested link when traffic in the network decreases.

46 Claims, 14 Drawing Sheets

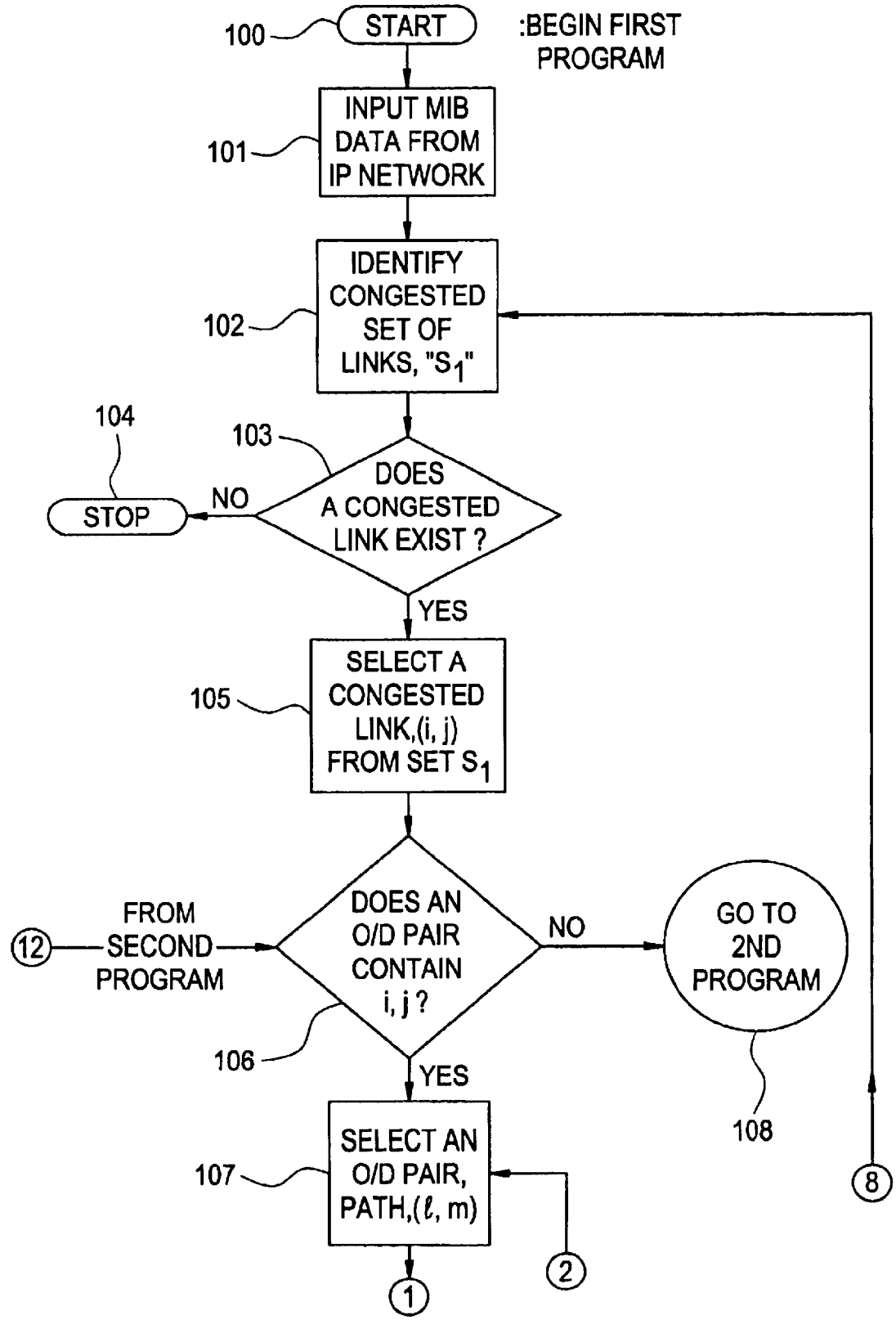

METHODS AND DEVICES FOR RELIEVING CONGESTION IN HOP-BY-HOP ROUTED PACKET NETWORKS

BACKGROUND OF THE INVENTION

The present invention is directed at relieving "congestion" in communications networks. In particular, the present invention is directed at relieving congestion in a network which uses "shortest path" routing techniques to manage data which is traversing, and congesting, the network.

The Internet is one example of such a network.

The Internet is a vast array of interconnected computers and computer systems. The ability to connect one personal computer to potentially a million other personal computers making up the Internet, requires a hierarchy of more sophisticated computers whose job is to "route" messages to and from these millions of computers in an efficient, fast and cost effective manner. These more sophisticated computers are aptly called "routers". With the explosive growth of the Internet has come a need to use more sophisticated routers to insure that communications between computers on the Internet remains relatively trouble free. Problems due to "congestion," which occurs, broadly speaking, when there are not enough communication channels or available bandwidth on such channels to handle the volume of messages being sent, have begun to occur. When congestion occurs it usually results in an increase in connection and response time, where it takes longer to connect to the Internet and/or receive responses to a search or message.

Within a specific geographic area many routers are placed into a group called an "autonomous system" ("AS"). Usually, each AS is controlled by an entity known as an Internet Service Provider ("ISP"). Thus, a message sent from Washington, D.C. to Philadelphia, Pa., for example, will typically travel over a number of ISPs each comprising their own array of routers. The routing of messages between ISPs connected to each other is typically performed using known "routing protocols". These protocols allow the respective routers within each ISP to "talk" with each other. There are a number of protocols which may be used to allow such communications.

More specifically, it is important for a router to know where an incoming message is supposed to be sent. Each message has associated with it a destination Internet protocol ("IP") address. Upon receiving the destination address, a router will use its embedded routing protocol to determine how best to forward the message to its final destination. Between the router which receives the message and the final destination of the message are any number of routers. Each successive router must select the next router in the chain of routers leading to the final destination. These next routers may be referred to as "next hops". The particular protocol used by a router will determine the "next hop" for the message. Once the message has been sent to a next hop router, this new router will repeat the process.

One class of routing protocols is known as a "link state" protocol. Routers using this type of protocol each share a combined database of information concerning all of the other routers within the same ISP. The information typically consists of the "network topology" and the "weight" of each communication "link". By network topology is meant the "road map" of complex connections between each router in an ISP. Each connection may in turn comprise a number of smaller links. Each link has a given "weight" which governs the amount of "traffic" or number of messages which may flow across each link depending on a variable, such as cost. A "path" from one router to another may be created by "stringing" a number of "weighted" links together. Because each router has access to information about all of the links within an ISP, each router is able to determine a "shortest path" from one router to another. Such a shortest path may include traversing a number of weighted links. Between each router there may exist a number of shortest paths or "equal cost paths" ("ECPs").

Some specific link state protocols are "Open Shortest Path First" and "Intermediate System-Intermediate System" protocols.

There may be hundreds, if not thousands of routers, in a pathway between the origin of a message and its eventual destination. Determining the shortest path through such an array of routers can be a daunting task; a task which is made even worse once this vast network of routers begins to become congested with traffic. Traditional approaches to managing congestion have faced two significant challenges. First, it has been thought that to effectively "manage congestion" through a given router, the amount of traffic through each and every router in an AS must be known at any given period of time. More precisely, this would require each router to analyze each message coming into it by looking at each messages "origin" and "destination" address. Taking it one step further, because a given link consists of an "origin" router and a "destination" router (called an origin/destination or "O/D" pair) it has been thought that what is needed is the ability to measure traffic flow (by origin and destination address) into and out of both the origin and destination routers. Even in a simple routing network, this task becomes insurmountable because of the thousands, if not millions, of messages and corresponding potential origin/destination addresses. If a router was asked to perform this task, its throughput would be greatly affected leading to a slower, less efficient pathway/network.

The second challenge relates to changing link weights. Again, a link's weight affects the amount of traffic which will traverse the link. An increase or decrease in a link's weight will increase or decrease traffic flow across that link. However, because each link is potentially a part of a million (for example) different paths, a simple change in one link may affect the traffic flow throughout each and every path which happens to include that link. Thus, attempts to decrease congestion through one link by changing its link weight would result in simply shifting the congestion to another link or path. Worse yet, the size and complex nature of the millions of paths connecting distant routers together makes the shifting of this congestion extremely unpredictable. Simply shifting traffic from one link to another may end up congesting a line of other links.

As mentioned initially, the Internet is only one type of network which utilizes routers and attempts to control congestion by looking at the "shortest paths" between two O/D routing pairs. In general, congestion is a problem in many networks using multiple routers. When data traverses from one router to the next it is sometimes referred to as going "hop-by-hop" or "next hop to next hop." In data communications, a single message may be broken up into "packets" of information which are routed "hop-by-hop".

To those skilled at the art, therefore, the problem becomes how to relieve congestion in hop-by-hop, routed packet networks. Accordingly, it is an object of the invention to provide for methods and devices which relieve congestion in hop-by-hop routed packet networks, such as the Internet.

It is another object of the invention to provide for such methods and devices which assume, contrary to present day wisdom, that the traffic flow through a pair of O/D routers in a given path cannot be determined and is, therefore, an unknown.

It is a further object of the present invention to provide for methods and devices which shift traffic flow from a congested link without congesting any additional links by either adjusting "splitting factors" associated with the congested link and alternative paths or, when no such alternative paths exist, by creating new alternative paths and then adjusting the respective alternative paths.

It is yet a further object of the present invention to provide for programs for adjusting splitting factors and creating alternative paths which make use of "virtual" networks.

It is still another object of the invention to provide for unique programs for deleting alternate paths which are no longer needed.

Other objectives, features and advantages of the present invention will become apparent to those skilled in the art from the following description taken in conjunction with the accompanying drawings.

SUMMARY OF THE INVENTION

In accordance with the present invention there are provided methods and devices which shift traffic flow from a congested link by adjusting the splitting factors associated with a congested link and alternative paths. Before traffic is shifted from a congested link, the present invention detects alternative shortest paths and then tests whether these alternative shortest paths are capable of receiving additional traffic. To minimize the disruption to a real world network, the tests are done by recreating the real world network as a virtual network. Only after an alternative shortest path has been tested and it has been determined that the path is capable of receiving additional traffic without disrupting the network or becoming congested itself is any traffic diverted from the congested link. The diversion or shifting of traffic from the congested link to an alternative, shortest path is carried out by changing the splitting factors associated with the congested link and the alternative path.

Sometimes no such alternative paths may be detected, i.e., none exist. The present invention then envisions methods and devices which create new alternative, shortest paths. These paths are created, again, by using a virtual network representation. In order to qualify as a new, shortest path, a path must meet a strict set of criteria to insure that the existing network is not disrupted. The new shortest paths are created by changing the link weights of the congested link and qualified paths.

In the event that traffic through a network decreases the present invention also envisions methods and devices for eliminating those paths or links which become inefficient. Inefficient paths are "removed" from the network by decreasing the splitting factor associated with a given inefficient path. Decreasing the splitting factor results in a likewise decrease in traffic over the link. The splitting factor may be decreased until there is no traffic moving over the inefficient link, thus, effectively removing it from the network.

The present invention and its advantages can be best understood with reference to the drawings, detailed description of the preferred embodiments and claims that follow.

DETAILED DESCRIPTION OF THE INVENTION

Prior to discussing the present invention, some additional background is in order. The present invention makes use of a number of assumptions, ones which are rooted in the features of today's existing routers. First, it is assumed that a router will be able to send a given packet of information along any number of "next hops" which help make up distinct paths from a given node to a destination node. The ability to support multiple next hops means that it is feasible to split traffic onto any number of paths between nodes. It is further assumed that the exact splitting, i.e., percentage of traffic sent along each path containing a next hop, can be specified for each router. Though the split may be determined by a number of variables, such as being made a function of the traffic coming into a router, the present invention assumes that the traffic will be split as a function of its destination. More particularly, as a function of the destination address of an incoming packet of information.

Figure 2:
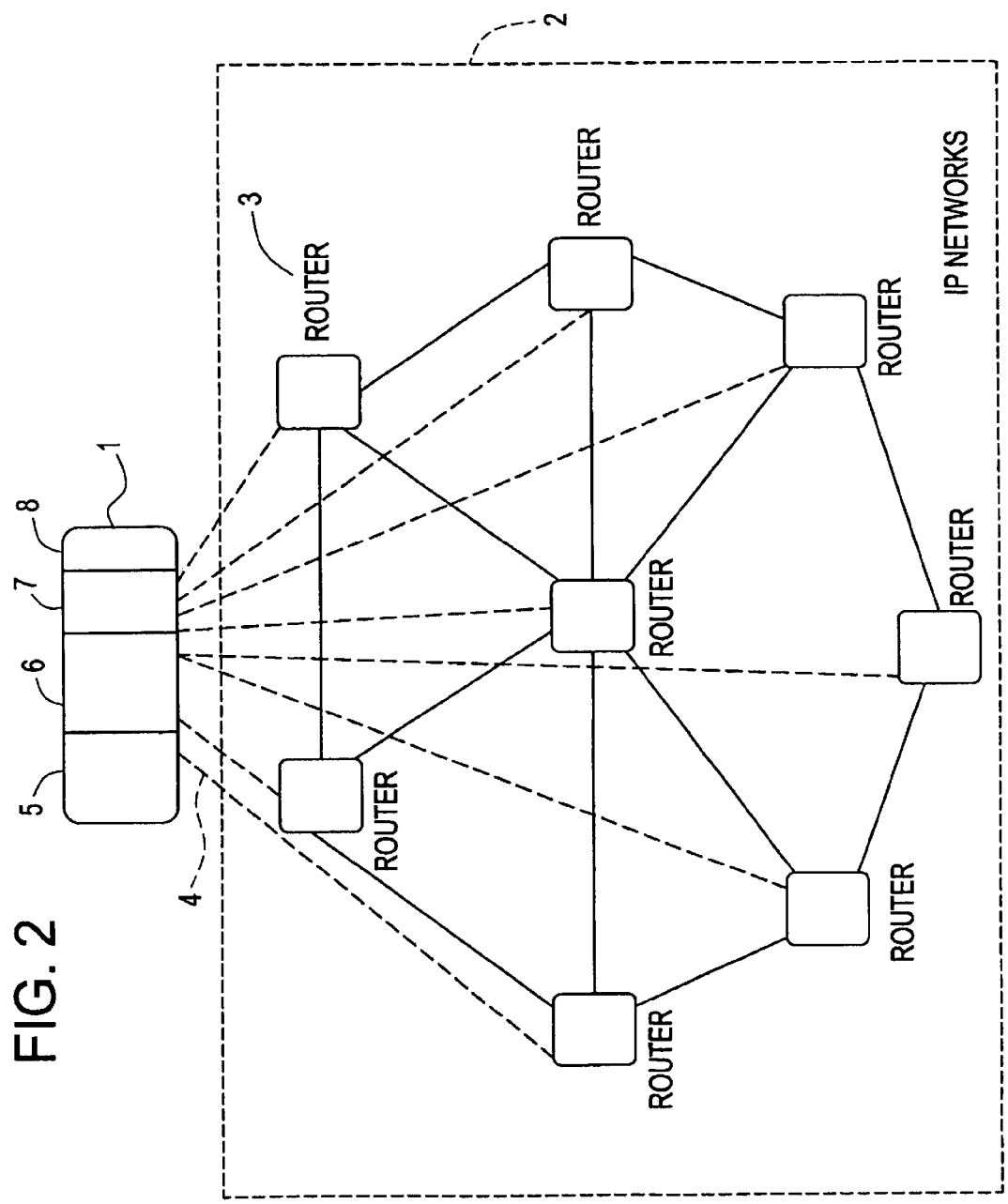
FIG. 2 depicts an IP tuner which comprises unique programs for shifting traffic away from congested links in an IP network.

With that as background, attention is now focused on FIG. 2 which depicts an IP tuner 1 according to one embodiment of the present invention.

The IP tuner 1 operates in a network 2 comprising a number of routers 3. The IP tuner 1 may comprise data collection unit or means 5 for collecting an extensive set of data via connections 4 from all of the routers 3. The IP tuner 1 further comprises splitting factor adjustment unit or means 6 and link weight assignment unit or means 7 which analyze this data to determine individual traffic splitting ratios and link weights for each of the routers 3 within the network 2. The calculated ratios and weights are then transmitted to each of the routers 3. In this manner the IP tuner 1 can be said to "tune" the network 2. The IP tuner 3 may be programmed with the topology of the network 2. The IP tuner 1 collects data using the well-known "simple network management protocol" ("SNMP"). The extensive set of data collected by the IP tuner is referred to in the art as "MIB" data, short for "management information base" data. For purposes of explaining the present invention, it is sufficient just to note that the IP tuner 1 uses MIB data to further analyze and adjust router splitting factors and link weights.

Once the IP tuner 1 has collected MIB data it proceeds to detect or determine whether any congested links exist within the network 2. Once a congested link is found, the IP tuner 1 then attempts to relieve congestion along this link using the present invention which, in summary, amounts to either adjusting the splitting ratios of the congested link and other alternative equal cost paths/links within the network 2 and/or by creating additional equal cost paths/links from within the network 2. Using either technique, traffic across the congested link is diverted away from the congested link and onto other links. Importantly, however, the diversion of traffic is controlled using the present invention such that the diversion does not create new congested links.

In another illustrative embodiment, the IP tuner 1 comprises a programmed device which further comprises a program memory or memory means 8. The program memory itself comprises programs or program means written in a form known to those in the art. The programs comprise first and second programs or means for diverting traffic from a congested link according to the present invention. The first program comprises a number of programs and program code for controlling the IP tuner 1 and instructs it to divert traffic from a congested link by adjusting splitting ratios. The second program also comprises a number of programs and program code for controlling the IP tuner 1 and instructs it to divert traffic from the congested link by creating additional equal cost paths or so called "shortest paths." It should be understood that the program code may comprise source code, object code or like code known to those in the art.

Figure 1:
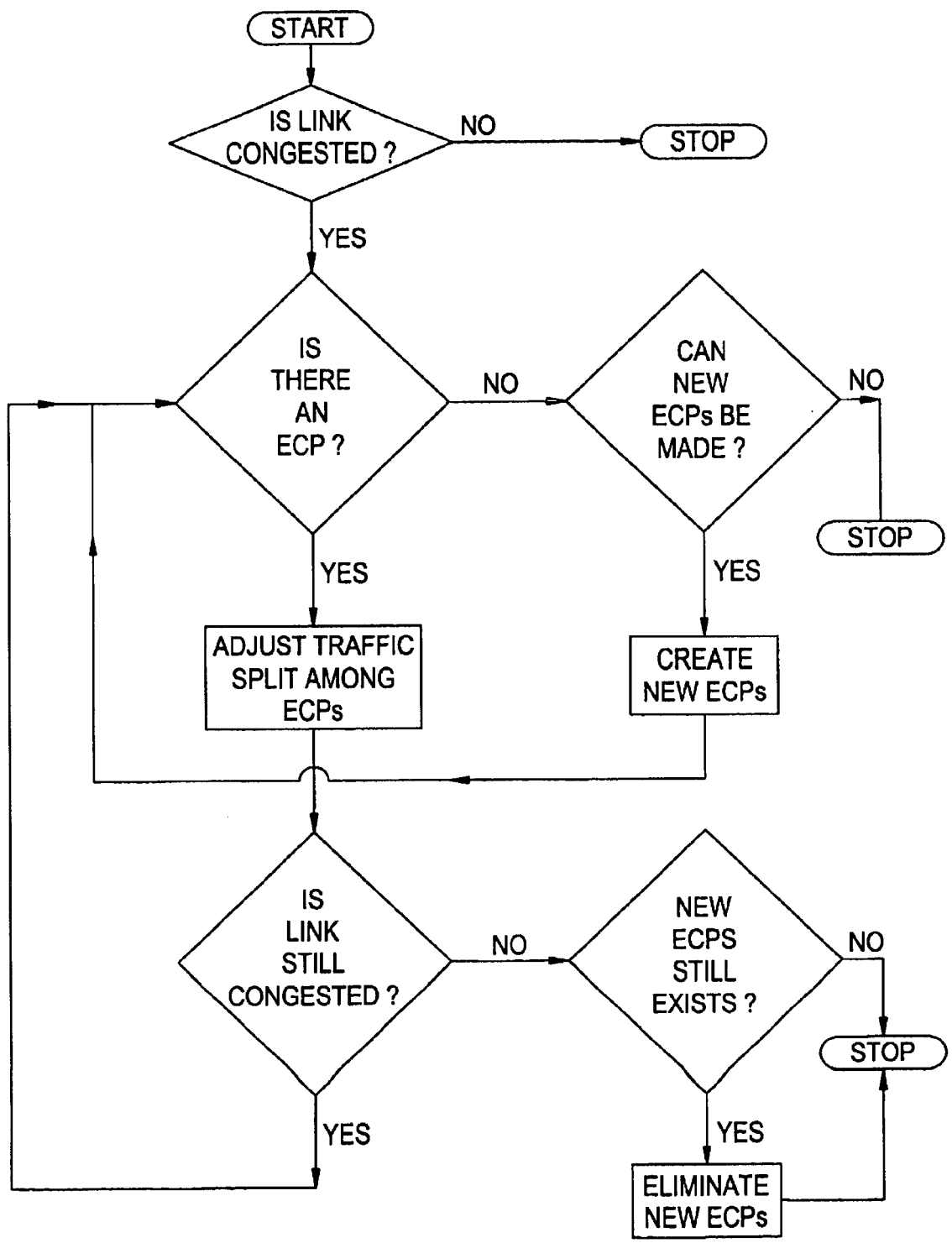
FIG. 1 depicts a flow diagram depicting programs for adjusting the splitting factors of paths, creating new paths and the deletion of paths within an IP network according to embodiments of the present invention.

Referring now to FIG. 1, there is depicted a flow diagram which provides an overview of the operation of the IP tuner 1 while executing programs according to the present invention.

Again, after the IP tuner 1 has collected MIB data, it next determines whether a congested link exists. Assuming such a link is detected, the IP tuner 1 executes the first program. The first program initially detects or determines whether other existing and valid, ECPs exist within the network 2. If other ECPs exist, the first program will attempt to adjust the splitting factors associated with the congested link and other ECPs. In the event that no ECPs exist or if it is not possible to adjust the splitting factors without creating additional congested links then the second program is triggered.

The second program first detects or determines whether new ECPs can be created. These new ECPs are, if they can be created, taken from qualified links/paths within the network 2. If no new ECPs can be created then the program is halted. At this point the IP tuner has determined that it is not practical to divert congestion from the congested link by either adjusting splitting factors or by creating new ECPs. If, however, additional, new ECPs can be generated or created the second program creates these ECPs and returns control of the IP tuner to the first program. Thereafter, when the first program checks to see if there are any ECPs it will determine that some in fact do exist (having been created using the second program). The first program will again attempt to divert traffic away from the congested link and onto the new ECPs by adjusting their respective splitting factors.

Finally, after the IP tuner 1 has detected or otherwise determined that traffic in the network or across a link has decreased the IP tuner 1 will eliminate any ECP which is no longer needed using a third program.

For the sake of clarity, when reference is made to shortest paths or alternative paths, these terms are synonymous with an ECP.

Figure 3B:
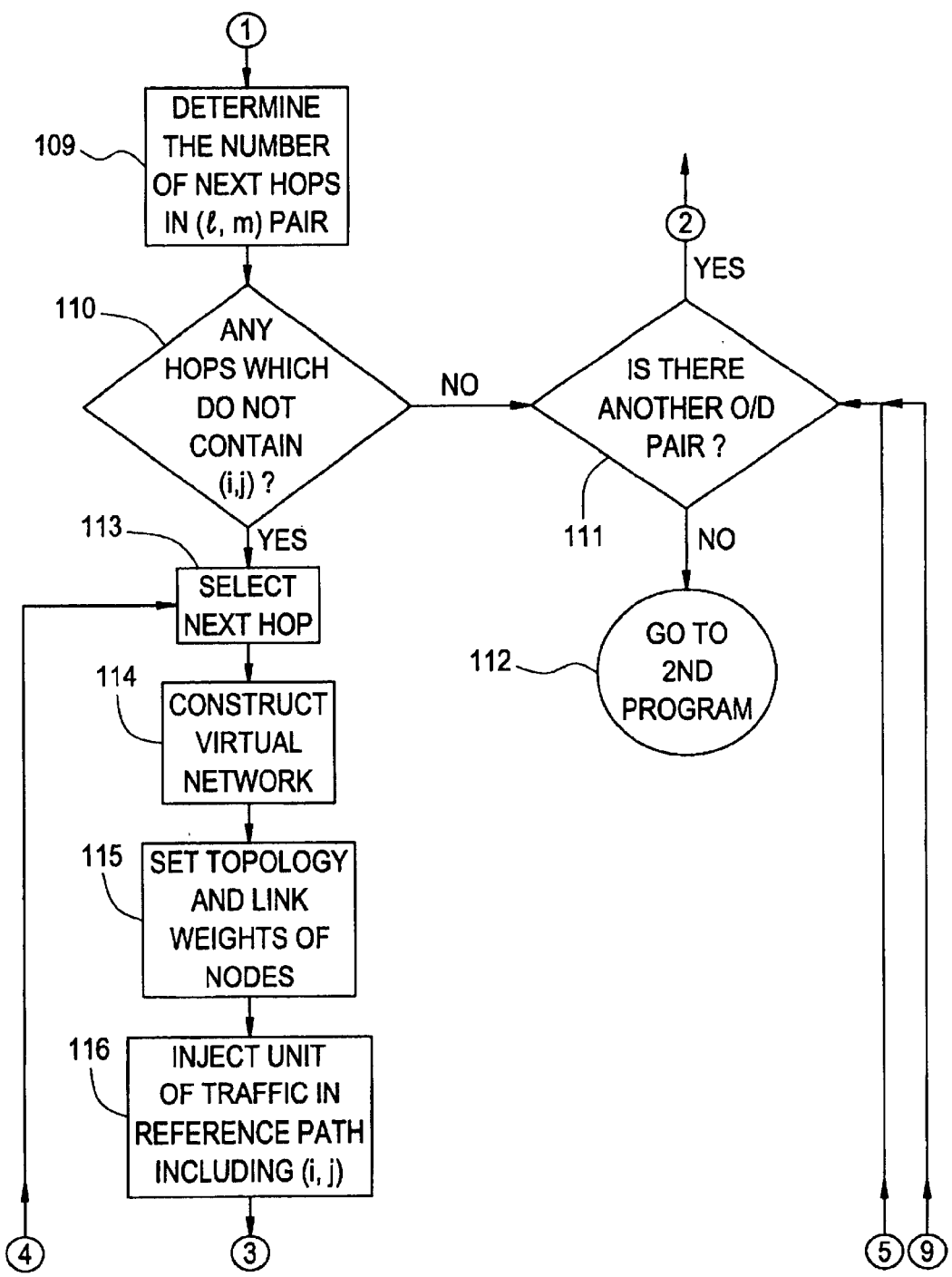
FIG. 3 depicts a flow diagram of a first program for adjusting the splitting factors of paths within an IP network in order to shift traffic away from a congested link according to embodiments of the present invention.
Figure 3C:
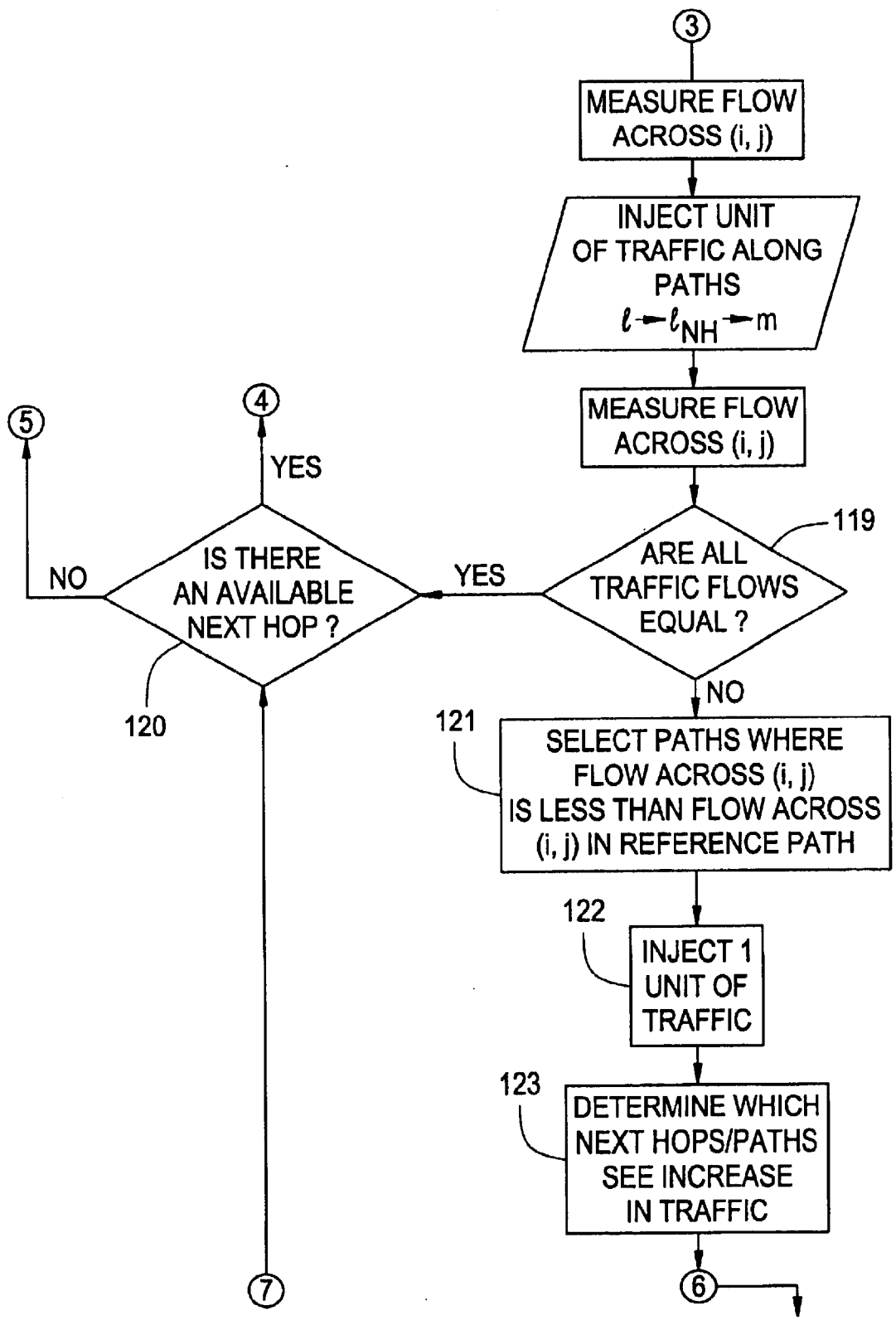
Figure 3D:
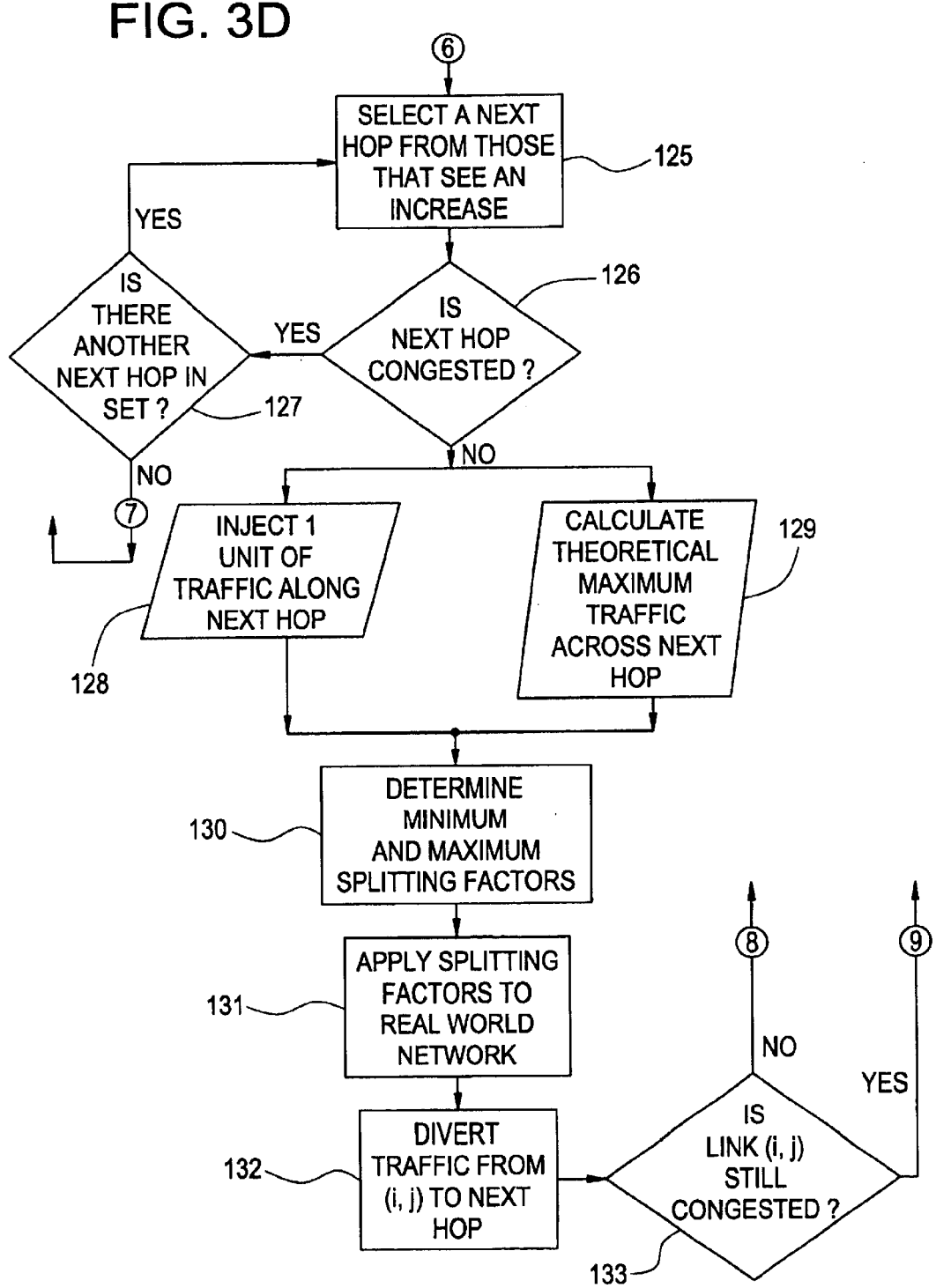

FIG. 3 depicts a more detailed flow diagram of the first program according to an embodiment of the present invention. Likewise, FIGS. 4 through 9 depict simplified network/router paths illustrating the adjustment of splitting factors according to one embodiment of the present invention.

Figure 4:
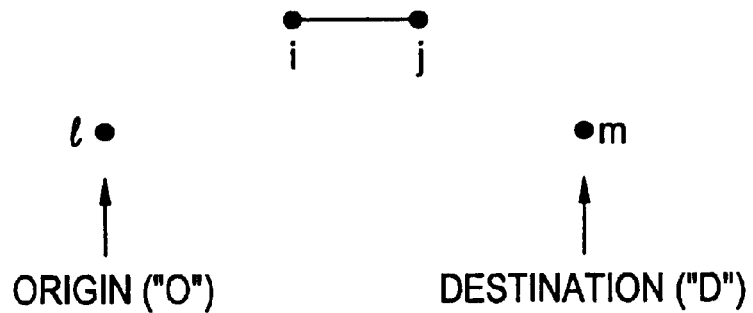
FIGS. 4–9 depict examples of real and virtual simplified paths of the first program according to embodiments of the present invention.
Figure 5:
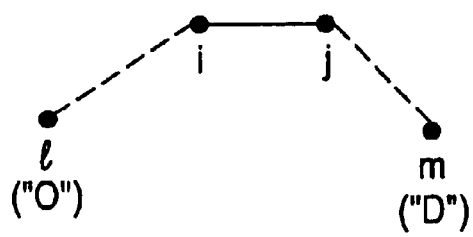

Referring to FIGS. 3, 4 and 5, the first program selects a congested link which we will call (i,j) from among a total set, S1, of congested links. The IP tuner 1 calculates this total set, S1, of congested links from MIB data. The congested link (i,j), however, is potentially a part of many (e.g., thousands) paths. The first program must select one path from among these paths, which comprises a path between two "end points" referred to as an "origin," l (e.g., router) and a "destination," m. The nodes l and m are referred to as an "O/D pair". Keeping in mind that the protocol being used by the network 2 to control traffic flow between routers 3 utilizes the shortest path between any two neighboring O/D pairs, the first program next detects or determines whether the congested link (i,j) lies within a shortest path within this fist O/D pair, (l, m). If the congested link (i,j) does not lie within a shortest path then the first program selects another O/D pair from among a set of pre-selected O/D pairs and repeats the procedure. If the congested link (i,j) does not lie within a shortest path of any of the available O/D pairs then the IP tuner 1 selects a second program which attempts to create new paths for diverting traffic away from the congested link (i,j).

Assuming, however, that the congested link (i,j) lies within a shortest path between l and m the first program must next detect or determine whether alternative paths exist which can accept additional traffic. Again, within the constraints of the protocol being used, these alternative paths must comprise additional shortest paths between node l and m.

The first program uses a "building block" approach to identifying the alternative paths. That is, the first program identifies the alternative paths by first detecting all of the surrounding next hops from node l. Any alternative path between l and m must begin at l and traverse one of the next hops (i.e., next nodes) surrounding node l.

Figure 6:
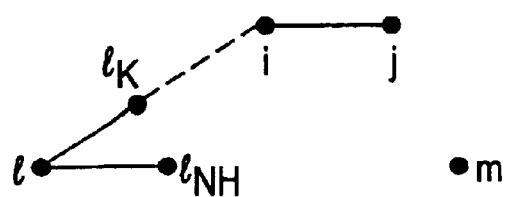

Referring to FIG. 6, two simplified paths are depicted. The first path, l→lk→i→j→m comprises the congested link (i,j) and next hop $l_k$. The second, alternative path l→$l_{NH}$→m comprises a next hop, $l_{NH}$. The link l to $l_{NH}$ is the first building block in a potential, alternative path from l to m. Not much more is known about the balance of the path after next hop $l_{NH}$. It should be understood that, although only one link l to $l_{NH}$ is shown, in reality, a large number of "next hops" exist represented by the single link l to $l_{NH}$.

In an extreme case, however, no other next hops other than $l_k$ will exist. Because this next hop is in the shortest path containing congested link (i,j), it will not be possible to shift traffic from congested link (i,j) using O/D pair (l,m). The first program then selects a new O/D pair (assuming a pair exists) and begins the process over again. If no pair is detected, then the second program is triggered.

In one embodiment of the invention, all of the above steps or determinations are carried out by the IP tuner 1 based on analyzing MIB data and executing the first program.

Up to now, the first program has been utilizing the topology of existing, real-world network 2. The present invention envisions, however, an embodiment where the first program utilizes both a real world and virtual network. More specifically, the IP tuner 1 generates an "image" of the real-world network 2, called a "virtual network." The virtual network is given the same network topology, link weights and link traffic flow(s) as the real-world network 2.

Continuing, though the IP tuner 1 has now determined that an alternative shortest path beginning with the link l to $l_{NH}$ exists, more is needed before traffic can be diverted from congested link (i,j) to this alternative path. The IP tuner 1 must know more about the paths between next hop $l_{NH}$ and node m. To determine whether congestion will occur requires a test of some sort. Ideally, such a test would divert traffic from the congested link (i,j) onto an alternative path without affecting any other path. Diverting real world traffic from a congested link onto a alternative path is not practical. For example, suppose there is a path leading from next hop $l_{NH}$ to m which is also congested. Any test which uses the real world network 2 may result in further congesting another real world link. This is to be avoided. Thus the need for a virtual network which mimics the real world network 2. Once such a virtual network is generated by the IP tuner 1, the IP tuner 1 can simulate the diversion of traffic using virtual representations of the congested link and alternative paths.

Figure 7:
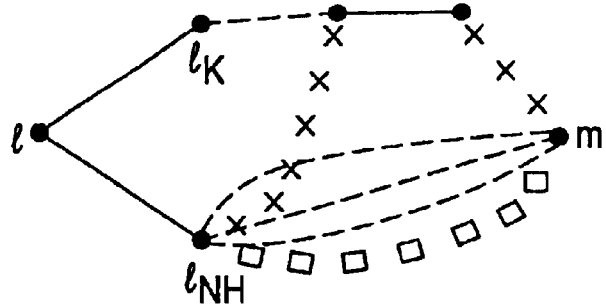

The simplified paths of FIG. 6, including those containing the congested link (i, j) and the alternative paths are re-created or generated as virtual paths in the IP tuner 1. To reiterate, it should be understood that the $l_{NH}$ to m connection is only one of many possible paths, as shown in FIG. 7. Again, all that is known for sure is that traffic will flow from 1 to $l_{NH}$. After that, traffic may flow to any one of a number of next hops or may flow directly to node m. (See FIG. 7.)

The first program instructs the IP tuner 1 to generate and internally inject a simulated amount of traffic, for example, one unit of traffic, through path $1 \rightarrow l_k \rightarrow i \rightarrow j \rightarrow m$. The traffic flow across link ($i \rightarrow j$) is measured and stored as a reference. Next, the IP tuner 1 repeats the process, this time sending the one unit of traffic through path $1 \rightarrow l_{NH} \rightarrow m$. Remembering that path $1 \rightarrow l_{NH} \rightarrow m$ is in reality a plurality of paths as shown in FIG. 7, the IP tuner 1 injects one unit of traffic through each of the paths.

After the IP tuner 1 has injected one unit of traffic through each of the paths $1 \rightarrow l_{NH} \rightarrow m$ in FIG. 7, it measures the traffic flow across the congested link (i,j). Each of the measurements is compared against the reference traffic flow measured when traffic was injected through path $1 \rightarrow l_k \rightarrow i \rightarrow j \rightarrow m$.

If the traffic flow across (i,j) for a given path $1 \rightarrow l_{NH} \rightarrow m$ is equal to or greater than the reference traffic flow across (i,j) then this alternative path is eliminated from further consideration. When a path is eliminated it is an indication that it will not be practical to divert traffic from congested link (i,j) in path $1 \rightarrow l_k \rightarrow i \rightarrow j \rightarrow m$ to a path $1 \rightarrow l_{NH} \rightarrow m$ because such a diversion puts the same or more traffic across link (i,j).

On the other hand, there may exist paths $1 \rightarrow l_{NH} \rightarrow m$ that, when the one unit of traffic is injected, result in little or no measured traffic flow across link (i,j). These paths remain eligible as possible alternative paths.

If it turns out that all of the alternative paths are eliminated then a new O/D pair must be selected by the first program and the process repeated, provided another O/D pair is available. If no other pair is available the second program is triggered.

So far, the first program has eliminated those paths which, when a unit of traffic is sent through, results in a traffic flow across link (i,j) equal to or greater than the flow across the path known to contain congested link (i,j). Still to be eliminated, however, are those virtual, shortest paths which do not have the same traffic flow, but nonetheless will become congested if traffic is diverted to them. The present invention determines this in two steps. First, the first program determines which alternative paths will see an increase in traffic when traffic is diverted from the congested link (i,j). This set of paths is represented by the notation $S_2$ in FIG. 8. These paths all begin at node 1 and then proceed to a next hop, e.g., $NH_1$ or $NH_2$ . . . . After this set has been determined the first program then extracts from this set those paths which not only will see an increase in traffic, but will also become congested. Said another way, it is acceptable to make use of alternative paths which see an increase in traffic when traffic is diverted from congested link (i,j). It is not acceptable, however, to make use of alternative paths which become congested.

Figure 8:
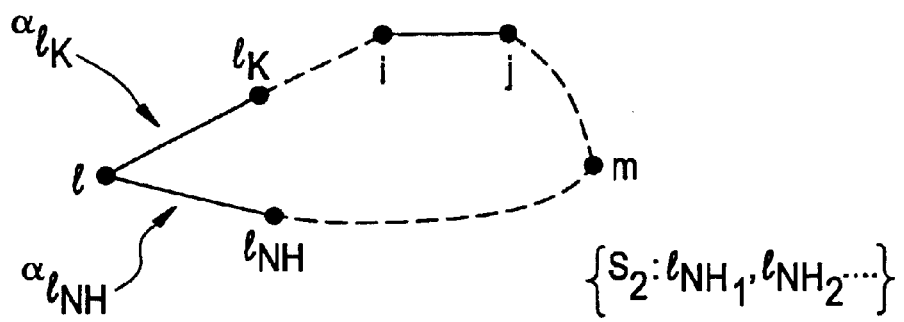

Referring to FIG. 8 there is shown the simplified paths just discussed with the addition of splitting factors $\alpha l_K$ and $\alpha l_{NH}$. Though not mentioned above, the one unit of traffic injected from node 1 to m was split using $\alpha l_K$ and $\alpha l_{NH}$. For purposes of explaining the present invention, both $\alpha l_K$ and $\alpha l_{NH}$ can be envisioned as percentages. For example, $\alpha l_K$ may be 80% while $\alpha l_{NH}$ may be 20%.

The present invention uses splitting factors to further eliminate those alternative paths which may become congested upon diverting traffic from the congested link. For instance, the first program may decrease the splitting factor, $\alpha l_K$, associated with the path containing congested link (i,j) while increasing $\alpha l_{NH}$. Once this is done, a unit of traffic is once again generated and injected in the virtual network between 1 and m. Because the splitting factors have been changed, the traffic flows measured for the path including the congested link and the path including link $(1, l_{NH})$ will now be different. More precisely, if all of the splitting factors associated with all of the possible next hops $l_{NH1}$, $l_{NH2}$ making up next hop $l_{NH}$ are changed then all of the traffic flows will change. The first program measures these traffic flows and detects or determines which paths see an increase in traffic without becoming congested versus those paths which see an increase in traffic but become congested. If all of the paths are determined to be congested, then another O/D pair must be selected. Provided one exists, the same procedure is repeated. If none exists, the second program is triggered.

The first program makes use of novel relationships between the one unit of traffic, splitting factors, capacity of the paths and traffic flows across the paths to determine which alternative paths see an increase in traffic without becoming congested. Mathematically, these relationships are given by:

$$S = \{(\text{links}): \gamma'_{NH} > \gamma'_k\}; \quad (1)$$

and $$\phi^{def} = \min C\rho - f/\gamma'_{NH} - \gamma'_k \quad (2)$$

Equation (1) identifies a set of links, S, whose utilization, i.e., traffic flow will increase if traffic is diverted to them while equation (2) relates to a measurement of the traffic flow across each set of links S.

In equation (1), $\gamma'_{NH}$ and $\gamma'_k$ are traffic flows. In equation (2), f, denotes traffic flow over a given link in the set, S, while $C\rho$ denotes the capacity of the given link.

The ability to determine which alternative paths will be able to accept traffic from a congested link without creating new congested links throughout the network is a significant achievement. The present invention, however, envisions more.

In another embodiment, the first program further detects or determines the amount of traffic which can be diverted to these alternative paths.

Figure 9:
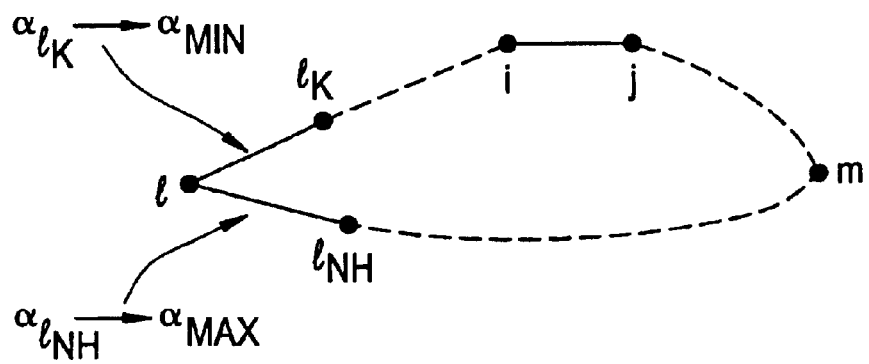

Referring to FIG. 9, there is shown similar paths as in FIG. 8 with the addition of $\alpha_{MIN}$ and $\alpha_{MAX}$. In an additional embodiment, the first program changes the splitting factor of the path containing the congested link (i,j) to a minimum, $\alpha_{MIN}$, while at the same time changing the splitting factor for next hops $l_{NH}$ to a maximum, $\alpha_{MAX}$. By so adjusting the splitting factors, the amount of traffic across the congested link is decreased while a maximum amount of traffic will flow across the alternative paths. Said another way, these minimums and maximums result in the maximum amount of traffic being diverted away from the congested link onto the alternative paths. The maximum splitting factors are equal to those splitting factors which divert traffic from the congested link up until the point where the alternative paths become congested.

The first program makes use of a second set of novel relationships which determine the maximum and minimum splitting factors which can be used. Mathematically, these relationships can be expressed as:

$$\Delta_{l,m} \leq <\overline{\Delta}_{l,m} = \min f/\beta \qquad (3)$$

$$\alpha^l_k = \alpha^l_k - \theta; \qquad (4)$$

and $$\alpha^l_{NH} = \alpha^l_{NH} + \theta. \qquad (5)$$

Equation (3) gives the upper bound on traffic flowing from node (l) to note (m) while equations 4 and (5) provide the splitting factors which may be used to divert traffic from the congested link (i,j) to an alternate shortest path, given shift $\theta$. Shift $\theta$ may be determined from the equation $\theta = \min (\alpha_{(l,m)} 1 - \alpha_{(l,m)}, \phi/\overline{\Delta}_{(l,m)})$.

The first program then exits the virtual network and transmits and applies these splitting factors to the corresponding paths in real world network 2 where applying the maximum splitting factor to a real world ECP/alternative path will divert traffic away from the congested link (i,j) but will not result in congesting the ECP. Hopefully, the diversion of traffic from the congested link (i,j) will solve the congestion problem. In one embodiment of the invention the first program measures the traffic along link (i,j). If congestion still remains, this is an indication that more traffic needs to be diverted from link (i,j). Unfortunately, O/D pair (l,m) may only comprise alternative paths capable of accepting a certain amount of diverted traffic and no more. Thus, if the link is still congested, the first program will again select another O/D pair and repeat the process. Once again, if no other O/D pair exists the second program is triggered.

If and when the first program determines that congested link (i,j) is no longer congested or that the congestion cannot be further decreased, it then selects another congested link and repeats the same process.

At any number of points along the way, the first program will trigger the execution of the second program once it has been determined that no additional alternative paths, or more precisely, equal cost paths or shortest paths, are available to divert traffic from the congested link.

Before getting into the details of the second program, some additional background is appropriate. One of the goals of the second program is to "create" additional shortest paths between a selected O/D pair, in this case (l,m). Remember, one of the parameters which determines how much traffic will flow through a given node, link or path or between a given O/D pair is the "weight" given to the link. By changing the weight of a link, the traffic flow across that link can be increased or decreased. The second program utilizes this idea to create new paths.

There are two main constraints that must be constantly kept in mind to achieve the advantages provided by the second program. First, when a new shortest path is created, it cannot alter any of the existing shortest paths. Second, the number of weight changes must be kept to a minimum. To explain further, suppose there exists three shortest paths between nodes l and m. The first constraint means that these three paths must be maintained as shortest paths when weights are changed to create the new shortest path. This of course, is easier said than done. Because each link is interwoven within the network 2, a change in one weight might dictate changes to others as well, again, in an unpredictable or complex manner. To minimize the potential disruption to the network 2, the second program makes use of the relationship between the weight of the congested link (i,j) and the remaining links within the network 2. In addition, the second constraint also helps ensure that minimum disruption will occur. By requiring that only a minimum number of weights be changed, the second program avoids "flooding" the network with new weights which will affect a substantial number of routers 3 within the network 2.

As is apparent from the preceding discussion, the second program is triggered when the first program determines that no ECPs are available to divert traffic from the congested link.

The first program has already selected an O/D pair which has at least one shortest path which comprises the congested link (i,j).

Figure 10A:
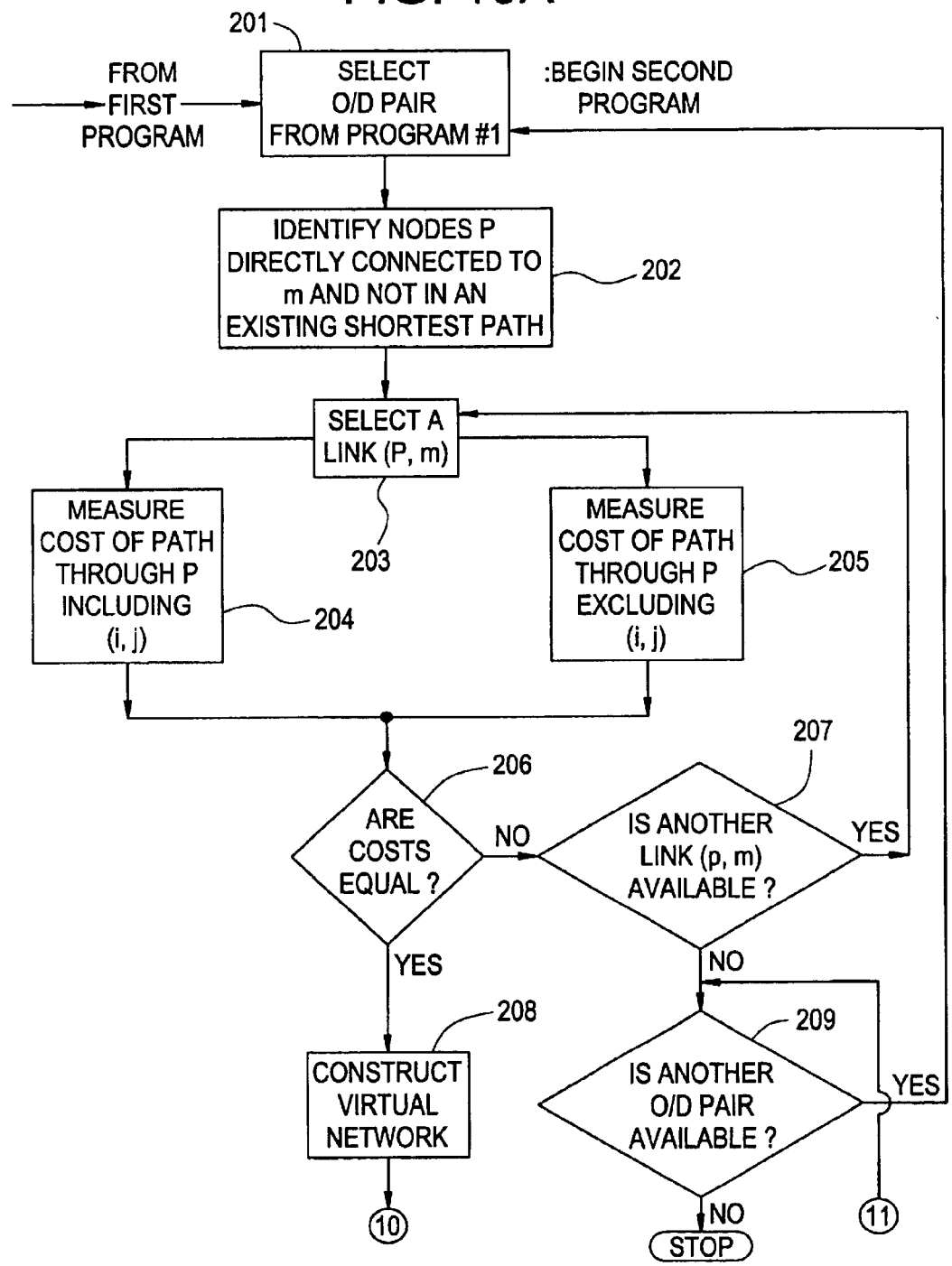
FIG. 10 depicts a flow diagram of a second program for creating alternate, equal cost paths within an IP network according to embodiments of the present invention.
Figure 10B:
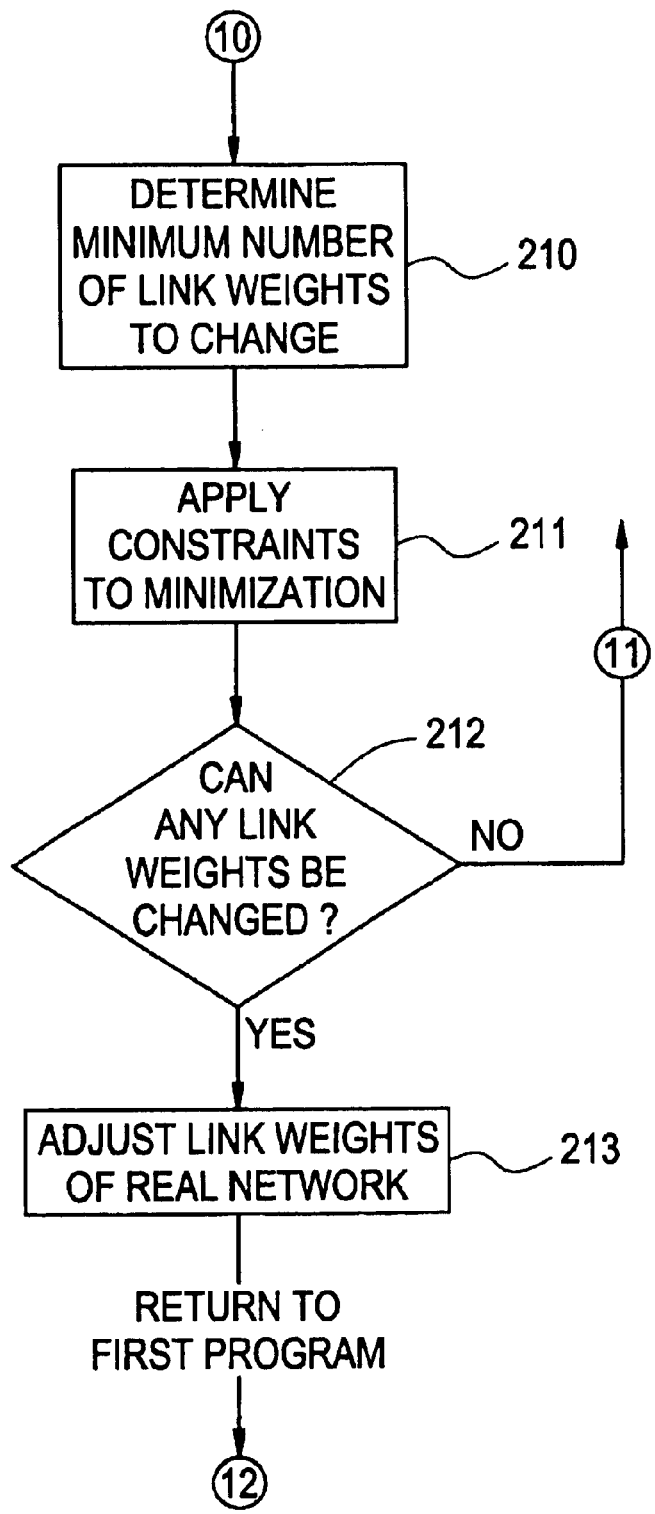
Figure 11:
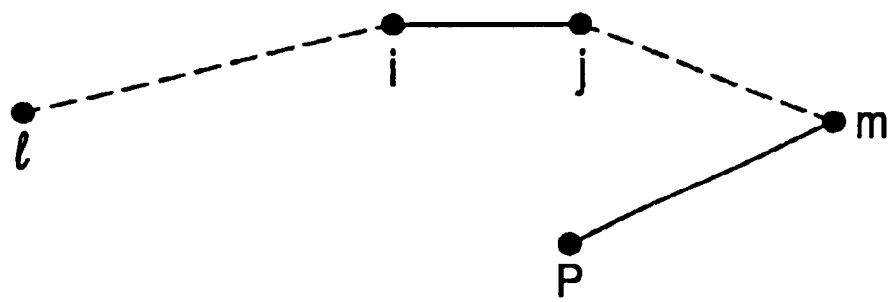
FIGS. 11, 12, 13 and 15 depict examples of real and virtual simplified paths of the second program according to embodiments of the present invention.

FIGS. 10 and 11 will help explain an exemplary embodiment of the second program. FIG. 10 depicts a flow diagram of the second program according to one embodiment of the present invention. FIG. 11 depicts simplified paths. Path l→i→j→m in FIG. 11 comprises a shortest path from l to m.

Added to FIG. 11 is new node, p. In one embodiment of the invention, three criteria must be met, i.e., detected by the IP tuner 1, for a path to qualify as a possible new shortest path. First, node p must be a next hop directly connected to m. In reality node p represents multiple nodes p all of which must be directly connected to m. Node p is shown as one node to make the following explanation as simple as possible.

Second, the link (or links) p→m must not be contained in any existing shortest path between l and m as detected by the IP tuner 1. This insures that any path chosen as a new shortest path containing link p→m will not impact an existing shortest path.

Third, the "distances" or cost from l→i→j→p must be equal to the cost from l→p assuming that link (i,j) is not in this latter path.

If all three criteria are met, then a path l→p→m qualifies as being a potential path which can be used as a new shortest path.

There is some chance that no path l→p→m will meet all three criteria. If so, the second program is halted and control is returned to the first program to select another O/D pair.

Figure 12:
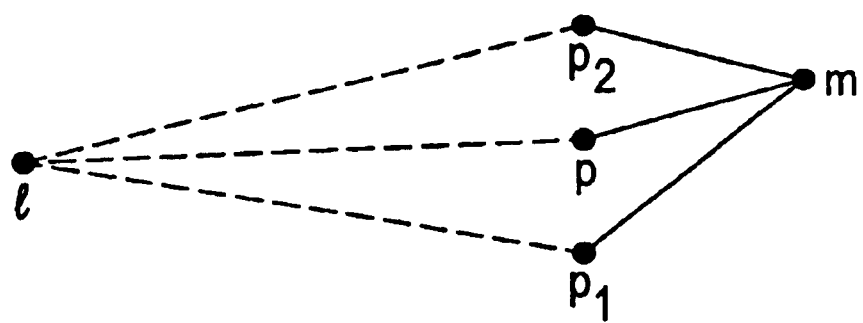

Assuming that paths l→p→m exist and are equal in cost to path l→i→j→p, these paths must be tested to insure they can accept traffic from congested link (i,j). FIG. 12 depicts the node p broken down into a number of nodes p, p1, p2 . . . . Each of the links p, p1, p2 . . . to m must be tested to see if they can accept traffic.

Up to now the second program has been utilizing data from real network 2. As before, however, testing the real network 2 is impractical. Instead, the second program generates and constructs a second virtual network to carry out the required tests.

Figure 13:
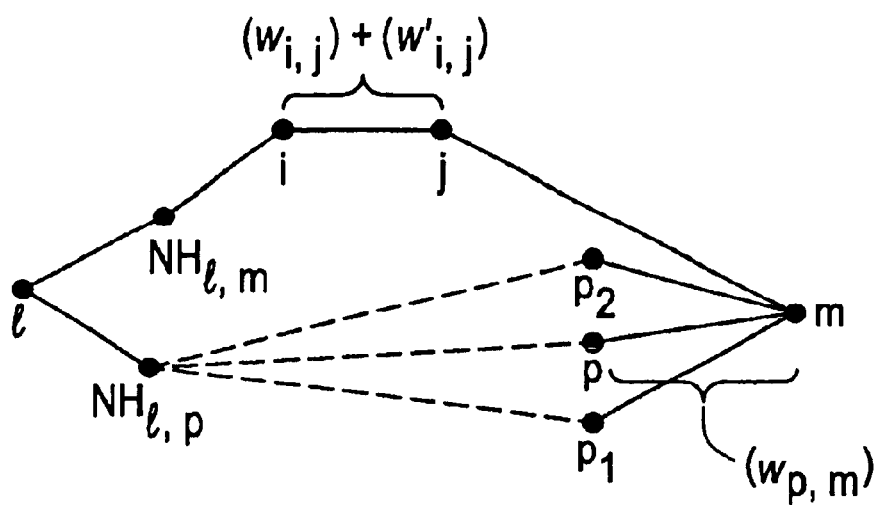

Referring to FIG. 13, there is shown two simplified paths of the virtual network. One path contains the next hop $NH_{l,m}$ and other next hop $NH_{l,p}$. Recall that it is unacceptable to change splitting factors because doing so will change the relationship between the shortest path containing (i,j) and the other existing shortest paths (not shown). Said another way, all of the existing shortest paths can be envisioned as being "ranked". Though they are all shortest paths, some are preferred over others. If the splitting factor of one of these existing shortest paths is altered, this may potentially change the rankings, sometimes in an unpredictable and complex manner. This must be avoided. Instead, the second program changes the weights of certain links. More specifically, the second program changes a minimum number of links' weights. By changing the weights of the congested link (i,j) and links (p,m) in alternative paths and not the splitting factors, the traffic which is flowing over each of the existing shortest paths will remain proportionately the same. In the meantime, a reduction in congested link (i,j)'s weight and an increase in links (p,m) weight will effectively reduce the traffic across (i,j) and increase the traffic over (p,m).

The second program comprises a set of novel relationships which will help determine the minimum number of links whose weights must be changed. These relationships can be represented mathematically by the expressions:

$$\min \sum_{i,j} / \tilde{\omega}_{i,j} - \omega'_{i,j} /; \quad (6)$$

$$\pi_j^p - \pi_i^p - \omega_{i,j} = 0, \forall (i,j) = \epsilon T_p, \forall_p \quad (7)$$

$$\pi_j^p - \pi_i^p - \omega_{i,j} \geq 0 \forall (i,j) \notin T_p, \forall_p \quad (8)$$

$$\pi_m' - \pi_p' - \omega_{p,m} = 0; \quad (9)$$

and $$\overline{10'}_{(i,j)} \geq 1. \quad (10)$$

These equations make use of relationships between the weight of the congested link, ω(i,j), and alternate link, ω(p,m). Briefly, equation (6) ensures that the IP tuner 1 changes the minimum number of weights in the qualified paths while maintaining the relationships between existing shortest paths; equations (7) and (8) ensure that alternative paths are the shortest paths; equation (9) is used by the IP tuner 1 to generate the link weights for the new shortest paths; and equation (10) ensures that all of the weights generated and applied by the IP tuner 1 are larger than 1. An additional requirement is that no fractional weights can be generated and applied by the IP tuner 1. The last two criteria ensure that the shortest path routing protocol can later make use of the link weights.

Occasionally, even at this stage, the second program will determine that there are no links whose weights can be changed without violating one or more of the above constraints.

In such an instance the second program first determines whether another link (p,m) exists. If so, the process is repeated. If not, then the second program selects another O/D pair provided one exists. If none exists then the second program is halted.

Provided a minimum amount of link weights can be changed the second program then exits the virtual network. The IP tuner 1 then generates the new link weights and applies them to real world links which are a part of real world network 2. These links include the congested link and links in qualified paths.

Once new, shortest paths are created, the second program triggers the first program which will first look to see if any equal cost paths exist. Because the second program has now created new equal cost paths, the first program will find these new paths and step through the process described before in order to shift traffic away from the congested link (i,j) through the adjustment of splitting factors.

So far, we have assumed the existence of a congested link. At some point, however, traffic in the network may decrease on its own. When this occurs, link (i,j) will become uncongested and the new links created by the second program will no longer be needed.

Figure 15:
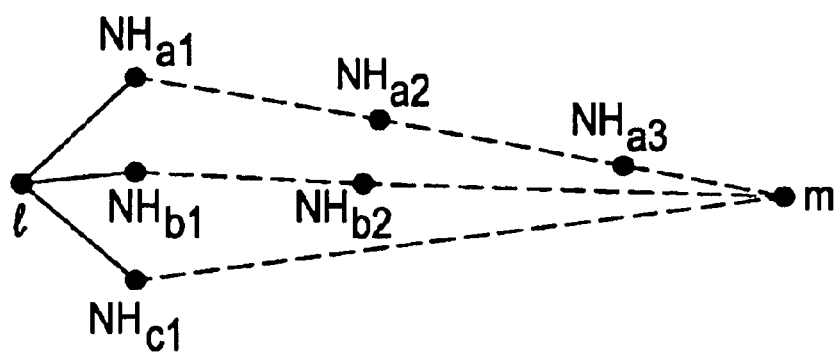
Figure 14A:
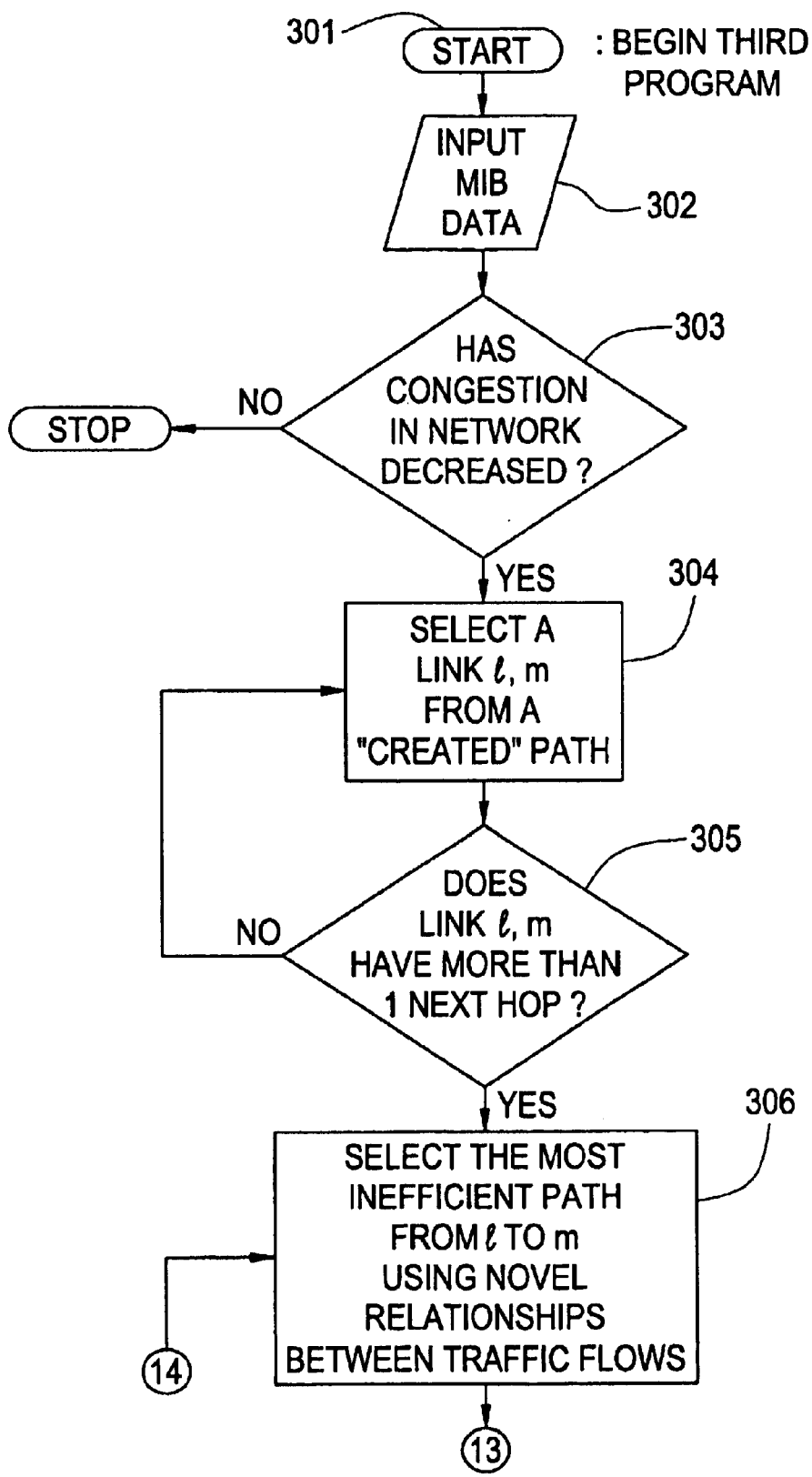
FIG. 14 depicts a flow diagram of a third program for deleting alternate, equal cost paths which are no longer needed.
Figure 14B:
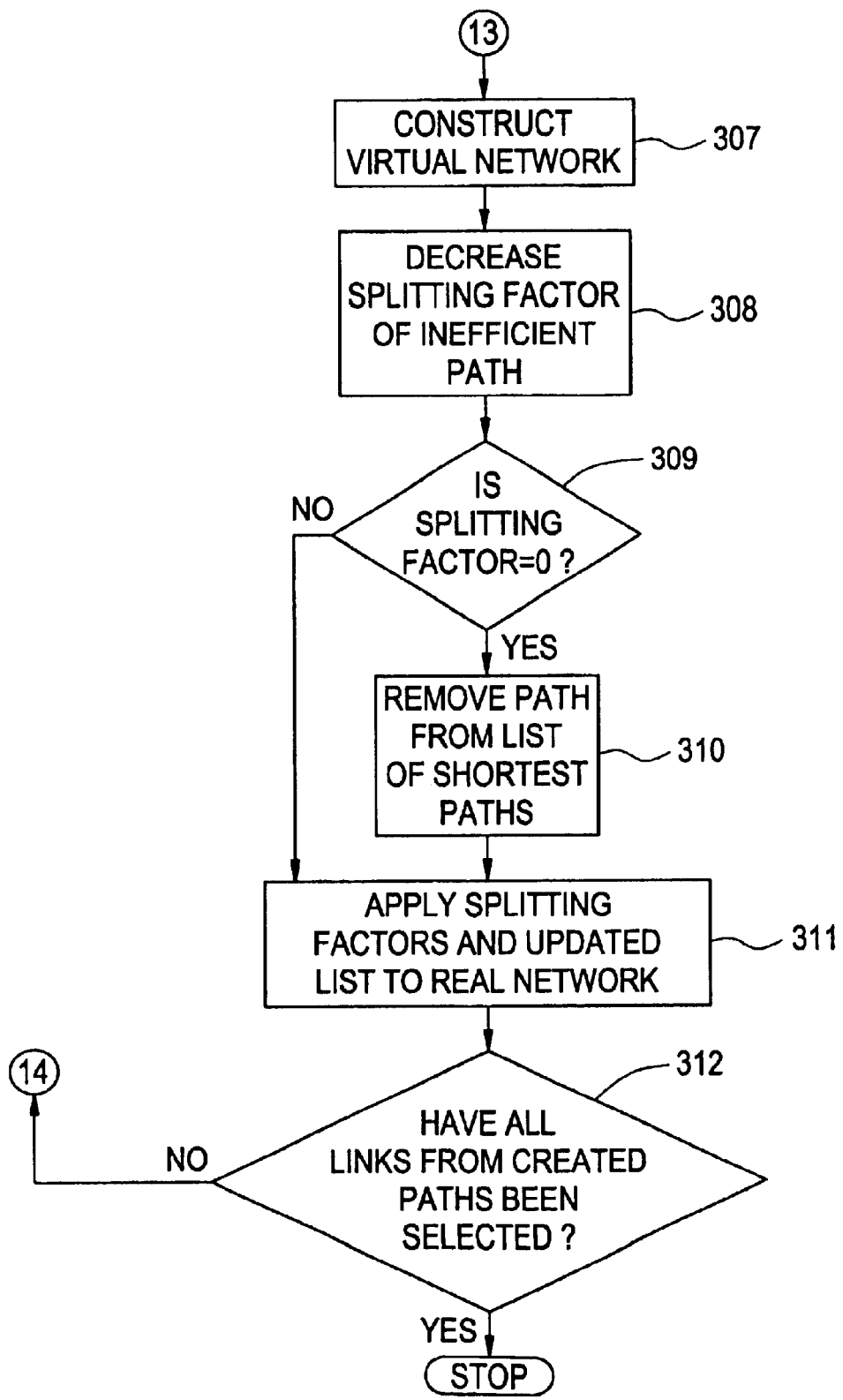

In one embodiment of the invention the IP tuner 1 comprises a third program or a programmed device which may further comprise program code for controlling the deletion of shortest paths in ECPs. Referring to FIG. 14 there is depicted a flow diagram of the third program according to one embodiment of the invention. FIG. 15 depicts a simplified path diagram where three paths in network 2 are shown between nodes 1 and m. The first path $1 \to NH_{a1} \to NH_{a2} \to NH_{a3} \to m$ contains three next hops; the second path $1 \to NH_{b1} \to NH_{b2} \to m$ contains two next hops; and the third path $1 \to NH_{c1} \to m$ contains one next hop.

Using the third program, the IP tuner 1 will detect and delete those paths which are inefficient. Generally speaking, the greater the number of hops in a given path, the more inefficient the path will be. Thus, in FIG. 15, the most inefficient path is the path containing next hops $NH_{a1}$, $NH_{a2}$ and $NH_{a3}$. Once an inefficient path is found, the third program generates and constructs a virtual network. In this virtual network, the splitting factor of the inefficient path is decreased thereby decreasing the amount of traffic flowing across it. This splitting factor is then transmitted and applied to real world network 2. It should be noted that the inefficient path may not be eliminated totally the first time its splitting factor is reduced. Eventually, when the splitting factor of a given alternative path is reduced to zero, then the path is no longer considered a working shortest path and is no longer available to the first program for the diversion of traffic from a congested link. No traffic will travel over this path. It is as if the path has been deleted from the network 2.

Once the splitting factor of a given path has been reduced, the third program will select the next most inefficient path and repeat the process. In this case, the path containing the two next hops $NH_{b1}$ and $NH_{b2}$ in FIG. 15 is the next most inefficient path. Once all of the paths have been reviewed and their splitting factors adjusted, the third program is halted. In one embodiment of the invention, the IP tuner 1 periodically triggers the third program when the IP tuner 1 detects a decrease in traffic flow in the network 2. In another embodiment the IP tuner 1 triggers the third program at pre-set intervals or upon reaching or receiving other triggers known in the art or MIB data.

Like the first and second programs, the third program makes use of novel relationships relating to the flow of traffic on the created paths or links in order to adjust the splitting factors accordingly. These relationships can be mathematically expressed as:

$$\Sigma_{(links) \epsilon \gamma'_k} > \Sigma_{(links) \epsilon \gamma'_{NH}} \quad (11)$$

Equation (11) is used to determine if there exists inefficiencies along paths containing node K or next hops, NH. If so, the inefficient links are numbered as just described above.

It should be understood that other mathematical relationships relevant to the present invention may be derived from the ones described above and that their derivation is within the skill of one skilled in the art.

Though the focus of the above discussion centered around the process of relieving congestion from a congested link, it should be understood that the present invention envisions devices, like the IP tuner 1 shown in FIG. 2, to carry out the invention.

It should be also be understood that the present invention envisions embodiments where the many processes discussed in detail above may be carried out by components, units, means or the like within the IP tuner 1. As mentioned before the IP tuner 1 may comprise a program memory which comprises programs for carrying out the invention.

Many of the processes discussed above may be controlled by program code stored in the program memory of a programmed device which may be made a part of an IP tuner or the like. The programmed device and\or memory may be a single unit or may comprise a number of units or a combination of devices such as random access memory, read-only memory, microprocessors and digital signal processors. Specifically, the program code may control many processes, such as the detection of ECPs, next hops and alternative paths and the generation of the virtual networks, to give just a few examples. In one embodiment, almost all of the processes discussed above may be controlled by program code.

It is to be understood that changes and variations may be made without departing from the spirit and scope of this invention as defined by the claims that follow.

We claim:

1. A method for relieving congestion in hop-by-hop, routed packet networks comprising:
    collecting data from a packet network;
    detecting a congested link within a packet network based on collected data;
    detecting an existing equal cost path within the network;
    generating a virtual network having the same network topology and traffic flow as the packet network and
    dynamically adjusting network splitting factors derived from the virtual network associated with the congested link and existing equal cost path to divert traffic away from the congested link.

2. The method as in claim 1 wherein detecting an existing equal cost path further comprises detecting whether the congested link lies within a shortest path.

3. The method as in claim 2 wherein the shortest path comprises a first origin and destination node pair.

4. The method as in claim 2 further comprising detecting alternative paths which can accept traffic from the congested link.

5. The method as in claim 1 further comprising simulating diversion of traffic from a congested link on the virtual network.

6. The method as in claim 1 further comprising generating virtual alternative paths having the same network topology, link weights and link traffic flows as real-world alternative paths which can accept traffic from the congested link and generating a virtual path containing the congested link.

7. The method as in claim 6 further comprising generating and injecting a simulated amount of traffic through the virtual path containing the congested link.

8. The method as in claim 7 wherein the simulated amount of traffic comprises one unit of traffic.

9. The method as in claim 7 further comprising:
    measuring traffic flow across the congested link and storing the measurement as a reference;
    generating and injecting a simulated amount of traffic through the virtual alternative paths;
    measuring traffic flow across the congested link after the simulated amount of traffic is injected into each virtual alternative path;
    comparing the measured traffic flow across the congested link for each of the virtual alternative paths with the reference;
    eliminating those virtual alternative paths having measured traffic flows across the congested link equal to, or greater than, the reference; and
    selecting another origin and destination node pair from a set of pre-selected origin and destination pairs when all of the virtual alternative paths have measured traffic flows across the congested link equal to, or greater than, the reference.

10. The method as in claim 7 further comprising generating and injecting a simulated amount of traffic through the virtual alternative paths.

11. The method as in claim 10 wherein the simulated amounts of traffic comprise one unit of traffic.

12. The method as in claim 10 further comprising:
    measuring traffic flow across the congested link, storing the measurement as a reference, and measuring traffic flow across the congested link after the simulated amount of traffic is injected into each virtual alternative path;
    comparing the measured traffic flow across the congested link for each of the virtual alternative paths with the reference;
    eliminating those virtual alternative paths having measured traffic flows across the congested link equal to, or greater than, the reference;
    selecting another origin and destination node pair from a set of pre-selected origin and destination node pairs when all of the virtual alternative paths have measured traffic flows across the congested link equal to, or greater than, the reference;
    eliminating those virtual alternative paths which will become congested if traffic is diverted to them;
    changing a splitting factor for the virtual alternative path containing the congested link and changing splitting factors for the virtual alternative paths which have not been eliminated;
    decreasing the splitting factor associated with the virtual alternative path containing the congested link and increasing the splitting factors associated with the virtual alternative paths which have not been eliminated;
    generating and injecting a simulated amount of traffic through the virtual alternative path containing the congested link and the virtual alternative paths which have not been eliminated;
    measuring traffic flows through the virtual alternative paths which have not been eliminated;
    detecting those virtual alternative paths which have not been eliminated and which do not become congested;
    selecting another origin and destination node pair from a set of pre-selected origin and destination node pairs when all of the virtual alternative paths which have not been eliminated are congested;
    detecting an amount of traffic which can be diverted to the virtual alternative paths which have not been eliminated and which do not become congested; and
    changing the splitting factor associated with the virtual path containing the congested link to a minimum splitting factor and changing the splitting factors associated with the virtual alternative paths which have not been eliminated and which do not become congested to maximum splitting factors.

13. The method as in claim 1 wherein adjusting the splitting factors associated with the congested link and existing equal cost path further comprises applying a minimum splitting factor to a path containing the congested link and applying a maximum splitting factor to the existing equal cost path.

14. The method as in claim 13 wherein the maximum splitting factor comprises a splitting factor which diverts traffic from the congested link up until a point where the equal cost path becomes congested.

15. The method as in claim 14 wherein the equal cost path comprises an alternative path to the existing equal cost path.

16. The method as in claim 1 further comprising:
detecting the presence of qualified paths within the network when no existing equal cost path is detected;
generating a new equal cost path from the qualified paths; and
adjusting splitting factors associated with the congested link and new equal cost path to divert traffic away from the congested link.

17. The method as in claim 16 wherein detecting the qualified paths further comprises:
detecting whether each path contains a next hop which is directly connected to a destination node contained in the existing equal cost path, detecting whether a link comprising the next hop and the destination node are contained in any existing shortest path between an origin node contained in the existing equal cost path and the destination node and detecting whether a cost of a path from the origin node to the next hop which contains the congested link is equal to a cost of a path from the origin node to the next hop which does not contain the congested link;
wherein each qualified path comprises a path which is directly connected to a destination node contained in the existing equal cost path, where the link comprising the next hop and destination node are not contained in any existing shortest path between an origin node contained in the existing equal cost path and the destination node and has a cost equal to the cost of a path from the origin node to the next hop which contains the congested link.

18. The method as in claim 17 further comprising:
generating a virtual network having the same network topology, link weights and link traffic flows as the packet network;
changing link weights of a virtual link comprising the congested link and changing link weights of virtual, qualified paths; and
changing a minimum number of link weights of the virtual, qualified paths.

19. The method as in claim 16 wherein generating a new equal cost path from the qualified cost paths comprises generating a virtual network having the same network topology, link weights and link traffic flows as the real-world network.

20. The method as in claim 16 wherein adjusting splitting factors associated with the congested link and new equal cost path comprises adjusting splitting factors of a congested link whose link weights have been changed and adjusting splitting factors of a new equal cost path whose link weights have been changed.

21. The method as in claim 1 further comprising:
detecting traffic across equal cost paths; and
eliminating equal cost paths detected to have a decrease in traffic flow.

22. The method as in claim 21 wherein eliminating equal cost paths detected to have a decrease in traffic flow comprises generating a virtual network having the same network topology, link weights and link traffic flows as the real-world network.

23. A programmed device for relieving congestion in hop-by-hop, routed packet networks comprising a program memory, the memory comprising:
a first program comprising program code for;
detection of a congested link within a packet network based on collected data,
controlling detection of an existing equal cost path within the network,
controlling generation of a virtual network having the same network topology and traffic flow as the packet network, and
dynamically controlling adjustment of network splitting factors derived from the virtual network associated with the congested link and existing equal cost path to divert traffic away from the congested link.

24. The programmed device as in claim 23 wherein the program code for detecting an existing equal cost path further comprises program code for controlling detection of whether the congested link lies within a shortest path.

25. The programmed device as in claim 24 wherein the shortest path comprises a first origin and destination node pair.

26. The programmed device as in claim 24 wherein the first program further comprises program code for controlling detection of alternative paths which can accept traffic from the congested link.

27. The programmed device as in claim 23 wherein the first program further comprises program code for controlling simulations of diversion of traffic from a congested link on the virtual network.

28. The program device as in claim 23 wherein the first program further comprises program code for controlling generation of virtual alternative paths having the same network topology, link weights and link traffic flows as the real-world alternative paths which can accept traffic from the congested link and generating a virtual path containing the congested link.

29. The programmed device as in claim 28 wherein the first program further comprises program code for controlling generation and injection of a simulated amount of traffic through the virtual path containing the congested link.

30. The programmed device as in claim 29 wherein the simulated amount of traffic comprises one unit of traffic.

31. The programmed device as in claim 29 wherein the first program further comprises:
program code for controlling measurement of traffic flow across the congested link and for storing the measurement as a reference;
program code for controlling generation and injection of a simulated amount of traffic through the virtual alternative paths;
program code for controlling measurement of traffic flow across the congested link after the simulated amount of traffic is injected into each virtual alternative path;
program code for controlling comparisons of the measured traffic flow across the congested link for each of the virtual alternative paths with the reference;
program code for controlling elimination of those virtual alternative paths having measured traffic flows across the congested link equal to, or greater than, the reference; and program code for controlling selection of another origin and destination node pair from a set of pre-selected origin and destination pairs when all of the virtual alternative paths have measured traffic flows across the congested link equal to, or greater than, the reference.

32. The programmed device as in claim 29 wherein the first program further comprises program code for controlling generation and injection of a simulated amount of traffic through the virtual alternative paths.

33. The programmed device as in claim 32 wherein the simulated amounts of traffic comprise one unit of traffic.

34. The programmed device as in claim 32 wherein the first program further comprises:

program code for controlling measurement of traffic flow across the congested link, storage of the measurement as a reference, and measurement of traffic flow across the congested link after the simulated amount of traffic is injected into each alternative path;

program code for controlling comparison of the measured traffic flow across the congested link for each of the virtual alternative paths with the reference;

program code for controlling elimination of those virtual alternative paths having measured traffic flows across the congested link equal to, or greater than, the reference;

program code for controlling selection of another origin and destination node pair from a set of pre-selected origin and destination node pairs when all of the virtual alternative paths have measured traffic flows across the congested link equal to, or greater than, the reference;

program code for controlling elimination of those virtual alternative paths which will become congested if traffic is diverted to them;

program code for controlling changing a splitting factor for the virtual alternative path containing the congested link and changing splitting factors for the virtual alternative paths which have not been eliminated;

program code for controlling a decrease in the splitting factor associated with the virtual alternative path containing the congested link and increases in the splitting factors associated with the virtual alternative paths which have not been eliminated;

program code for controlling generation and injection of a simulated amount of traffic through the virtual alternative path containing the congested link and the virtual alternative paths which have not been eliminated;

program code for controlling measurement of traffic flows through the virtual alternative paths which have not been eliminated;

program code for controlling detection of those virtual alternative paths which have not been eliminated and which do not become congested;

program code for controlling selection of another origin and destination node pair from a set of pre-selected origin and destination node pairs when all of the virtual alternative paths which have not been eliminated are congested;

program code for controlling detection of an amount of traffic which can be diverted to the virtual alternative paths which have not been eliminated and which do not become congested; and program code for controlling changing a splitting factor associated with the virtual path containing the congested link to a minimum splitting factor and changing splitting factors associated with the virtual alternative paths which have not been eliminated and which do not become congested to maximum splitting factors.

35. The programmed device as in claim 23 wherein the program code for controlling the adjustment of the splitting factors associated with the congested link and existing equal cost path further comprises program code for controlling application of a minimum splitting factor to a path containing the congested link and application of a maximum splitting factor to the existing equal cost path.

36. The programmed device as in claim 35 wherein the maximum splitting factor comprises a splitting factor which diverts traffic from the congested link up until a point where the equal cost path becomes congested.

37. The programmed device as in claim 36 wherein the equal cost path comprises an alternative path to the existing equal cost path.

38. The programmed device as in claim 23 wherein the memory further comprises a second program, the second program comprising program code for controlling detection of the presence of qualified paths within the network when no existing equal cost path is detected, program code for controlling generation of a new equal cost path from the qualified paths and program code for controlling adjustment of splitting factors associated with the congested link and new equal cost path to divert traffic away from the congested link.

39. The programmed device as in claim 38 wherein the second program for controlling the detection of the qualified paths further comprises program code for controlling detection of whether each path contains a next hop which is directly connected to a destination node contained in the existing equal cost path, detection of whether a link comprising the next hop and the destination node are contained in any existing shortest path between an origin node contained in the existing equal cost path and the destination node and detection of whether a cost of a path from the origin node to the next hop which contains the congested link is equal to a cost of a path from the origin node to the next hop which does not contain the congested link, wherein each qualified path comprises a path which is directly connected to a destination node contained in the existing equal cost path, where the link comprising the next hop and destination node are not contained in any existing shortest path between an origin node contained in the existing equal cost path and the destination node and has a cost equal to a cost of a path from the origin node to the next hop which contains the congested link.

40. The programmed device as in claim 39 wherein the second program further comprises program code for controlling generation of a virtual network having the same network topology, link weights and link traffic flows as the packet network.

41. The programmed device as in claim 38 wherein the program code for controlling generation of new equal cost path from the qualified paths comprises program code for controlling generation of a virtual network having the same network topology, link weights and link traffic flows as the real-world network.

42. The programmed device as in claim 41 wherein the second program further comprises program code for controlling changing link weights of a virtual link comprising the congested link and changing link weights of virtual, qualified paths.

43. The programmed device as in claim 38 wherein the program code for controlling the adjustment of splitting factors associated with the congested link and new equal cost path comprises program code for controlling adjustment of a splitting factor of a congested link whose link weights have been changed and program code for controlling adjustment of a splitting factor of a new equal cost path whose link weights have been changed.

44. The programmed device as in claim 23 wherein the memory further comprises a third program, the third program comprising program code for controlling detection of traffic across equal cost paths and program code for controlling elimination of equal cost paths detected to have a decrease in traffic flow.

45. The programmed device as in claim 44 wherein the program code for controlling the elimination of equal cost paths detected to have a decrease in traffic flow comprises program code for controlling generation of a virtual network having the same network topology, link weights and link traffic flows as the real-world network.

46. A device for relieving congestion in hop-by-hop, routed packet networks comprising:
  a collection unit adapted to collect data from a packet network;
  a program memory comprising a first program, the first program comprising program code for:
    controlling detection of a congested link within the network based on the collected data,
    controlling detection of an existing equal cost path within the network,
    controlling the generation of a virtual network having the same network topology and traffic flow as the packet network, and
    dynamically controlling adjusting of network splitting factors derived from the virtual network associated with the congested link and existing equal cost path to divert traffic away from the congested link.

* * * * *

UNITED STATES PATENT AND TRADEMARK OFFICE
CERTIFICATE OF CORRECTION

| | | |
|---|---|---|
| PATENT NO. | : 6,831,895 B1 | Page 1 of 1 |
| APPLICATION NO. | : 09/314107 | |
| DATED | : December 14, 2004 | |
| INVENTOR(S) | : Hongbin Ji, Muralidharan Sampath Kodialam and Yung-Terng Wang | |

It is certified that error appears in the above-identified patent and that said Letters Patent is hereby corrected as shown below:

Column 11, line 35, Equation (10) reads "$1\overline{07}_{(i,j)} \geq 1$."; it should read --$\omega'_{(i,j)} \geq 1$.--

Signed and Sealed this

Twenty-second Day of August, 2006

JON W. DUDAS
*Director of the United States Patent and Trademark Office*